United States Patent [19]

Hashimoto et al.

[11] Patent Number: 5,442,684
[45] Date of Patent: Aug. 15, 1995

[54] METHOD AND ARRANGEMENT OF LOCATING CORDLESS UNITS IN WIDE AREA CORDLESS TELEPHONE SYSTEM

[75] Inventors: Tadao Hashimoto, Tokyo; Ryoji Hara, Hiroshima; Yasuhiro Fujimura, Osaka, all of Japan

[73] Assignee: NEC Corporation, Tokyo, Japan

[21] Appl. No.: 181,878

[22] Filed: Jan. 13, 1994

Related U.S. Application Data

[63] Continuation of Ser. No. 712,763, Jun. 10, 1991, abandoned.

[30] Foreign Application Priority Data

Jun. 8, 1990 [JP] Japan .................................. 2-151088

[51] Int. Cl.⁶ .................................................. H04M 11/00
[52] U.S. Cl. ........................................ 379/61; 379/59; 379/58; 455/33.1
[58] Field of Search .............................. 379/58–63; 455/54.1, 54.2, 56.1

[56] References Cited

U.S. PATENT DOCUMENTS

| | | | |
|---|---|---|---|
| 4,843,622 | 6/1989 | Yatsutani et al. | 379/63 |
| 4,852,148 | 7/1989 | Shibata et al. | 379/59 |
| 4,879,740 | 11/1989 | Nagashima et al. | 379/61 |
| 4,955,050 | 9/1990 | Yamauchi | 379/59 |
| 5,054,110 | 10/1991 | Comroe et al. | 455/54.1 |

Primary Examiner—Curtis Kuntz
Assistant Examiner—G. J. Oehling
Attorney, Agent, or Firm—Sughrue, Mion, Zinn, Macpeak & Seas

[57] ABSTRACT

A method and arrangement of locating cordless units in a wide area cordless telephone system is disclosed. A service area is previously divided into a plurality of small service zones and, a plurality of cordless units are provided for establishing communications with a system controller via a plurality of access stations. The system controller locates the cordless units and stores therein location data thereof. Each of the cordless units also stores the location data thereof applied from the system controller. A cordless unit issues a request signal which includes cordless unit location data. The request signal is received at an access station which in turn checks to determine if the request signal applied thereto is issued from a cordless unit whose location data indicates a service zone belonging to a predetermined service zone group. In the event that the cordless unit location data applied to the access station is found to fall within the predetermined service zone group, the access station relays the request signal applied thereto, together with a signal level of the request signal, to the system controller.

9 Claims, 9 Drawing Sheets

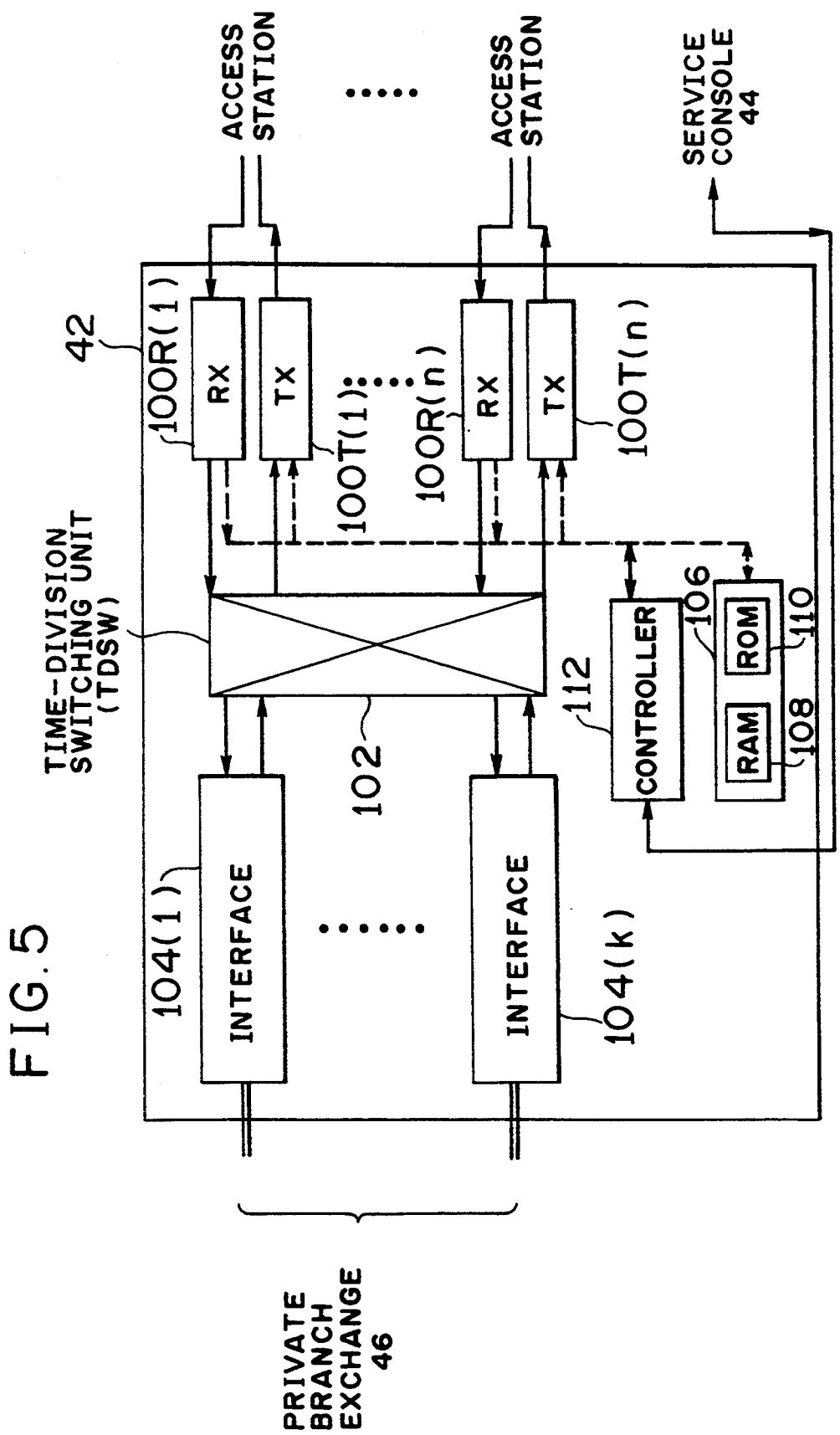

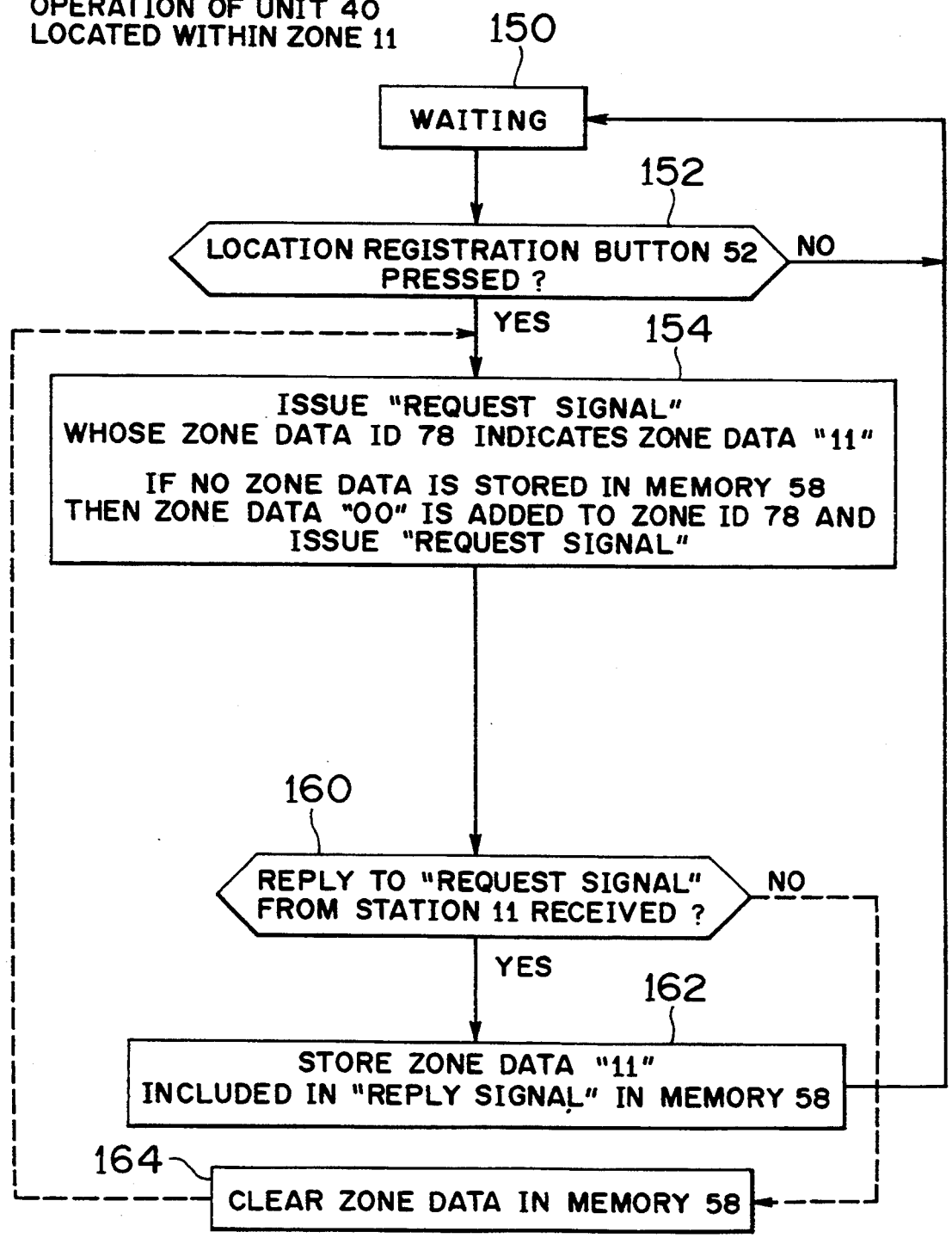

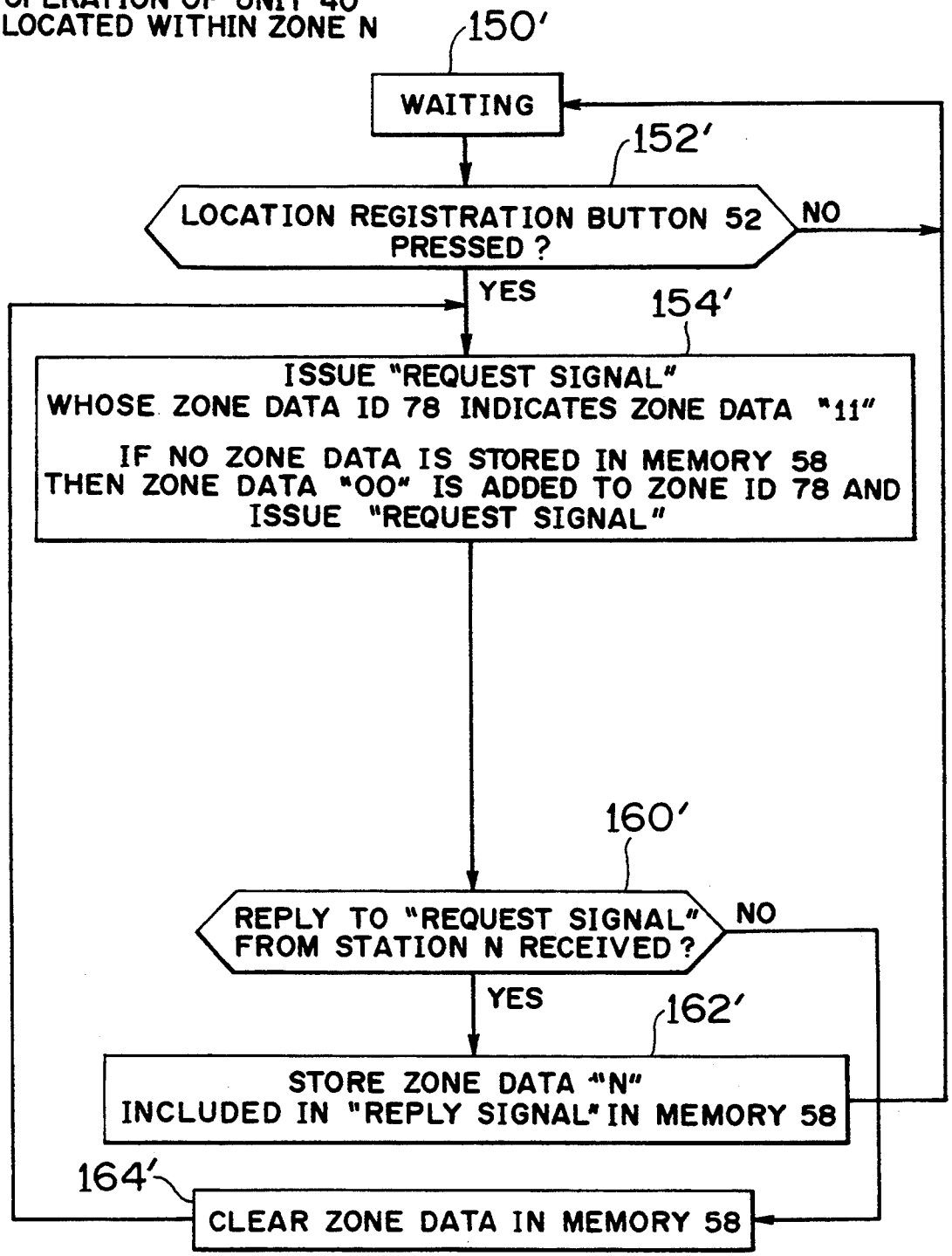

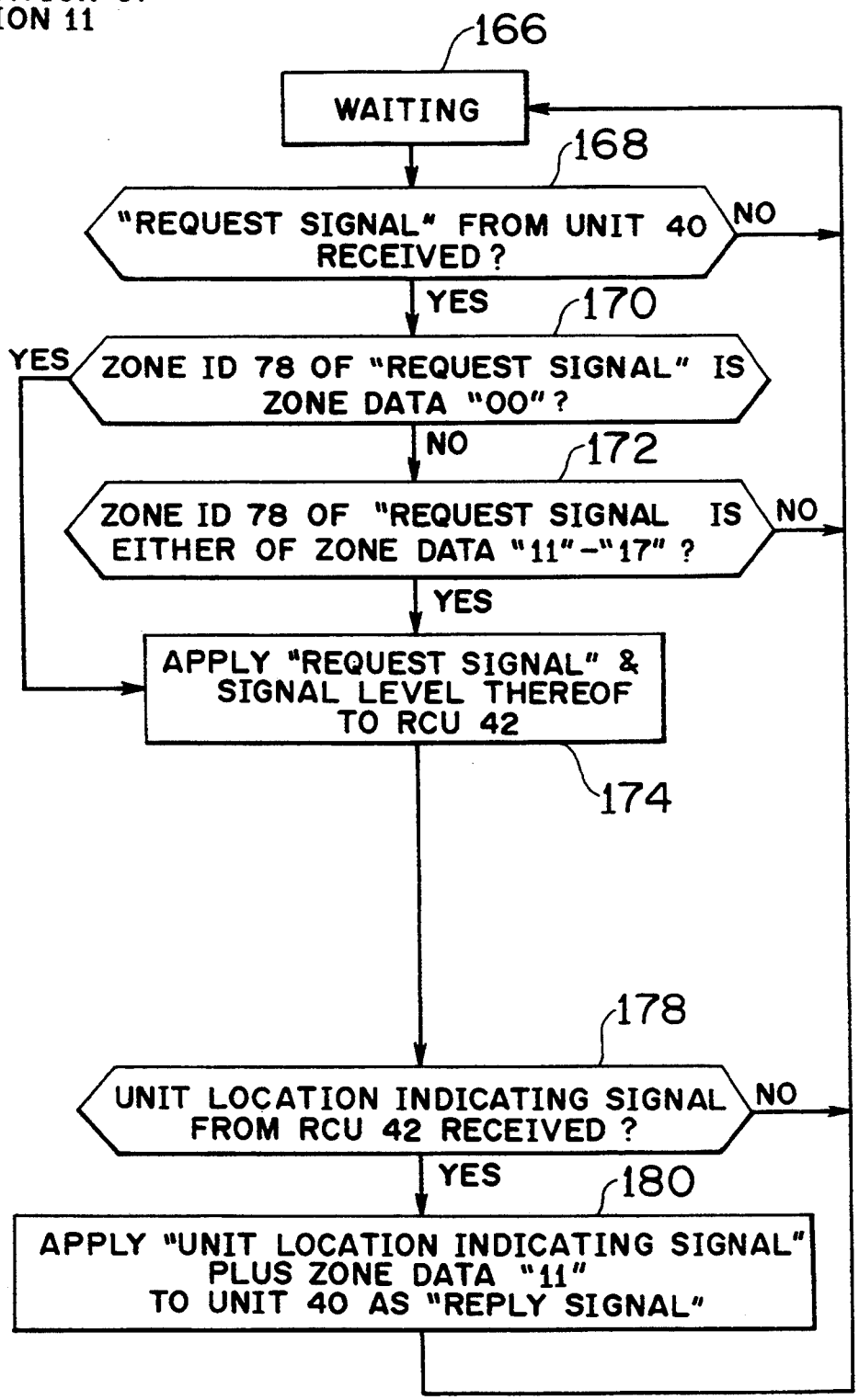

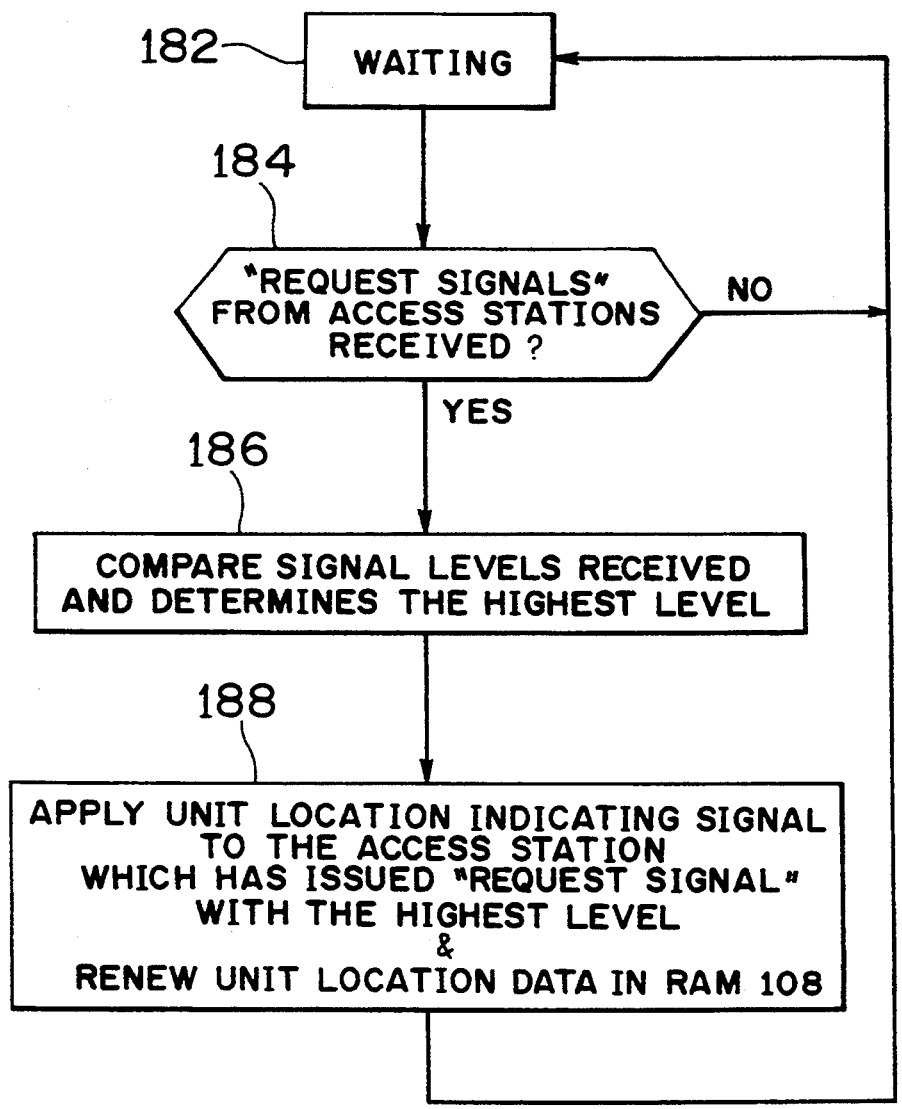

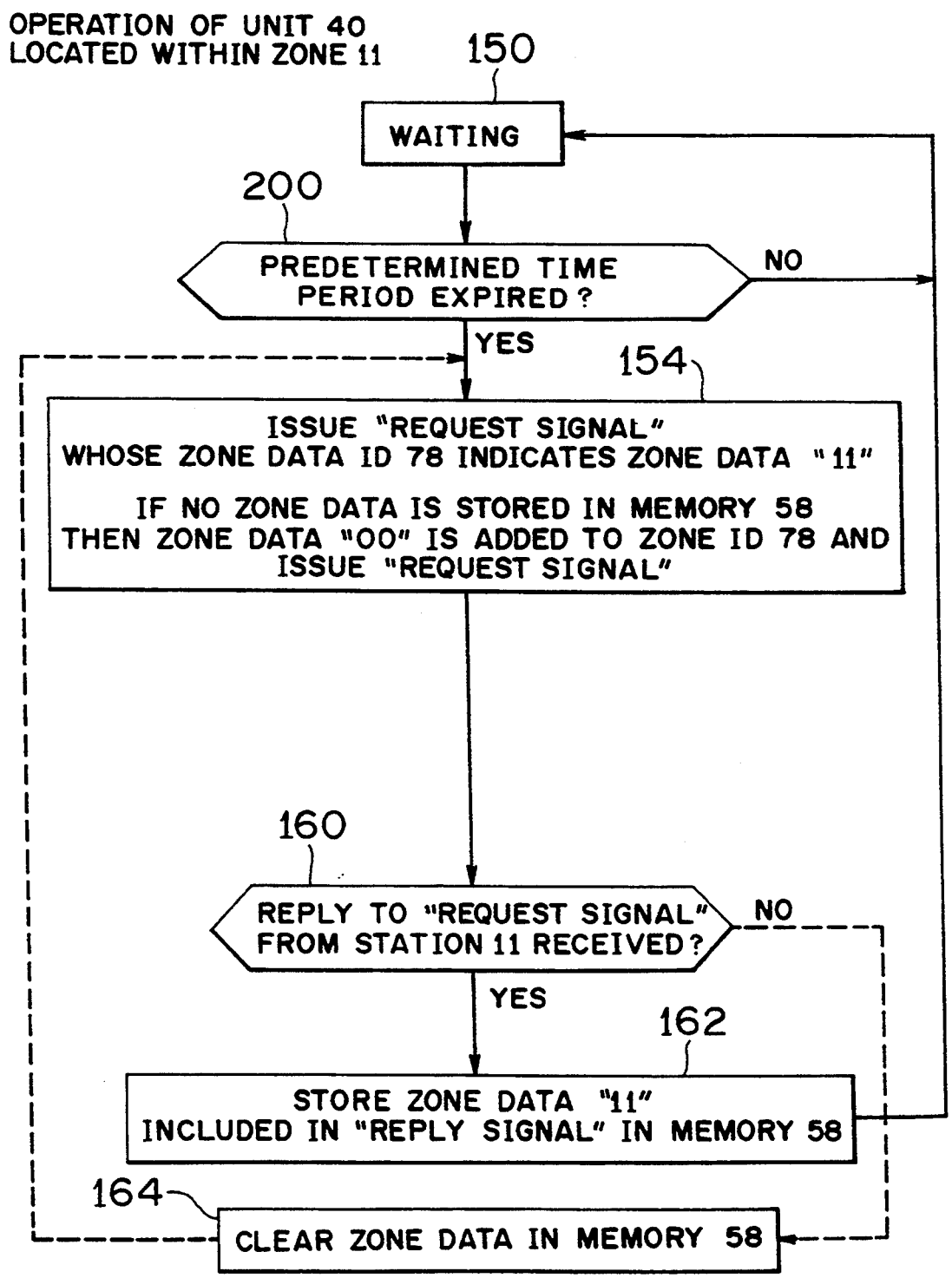

METHOD AND ARRANGEMENT OF LOCATING CORDLESS UNITS IN WIDE AREA CORDLESS TELEPHONE SYSTEM

This is a continuation of application Ser. No. 07/712,763, filed Jun. 10, 1991, now abandoned.

BACKGROUND OF THE INVENTION

1. Field of the Invention

The present invention relates generally to a wide area cordless telephone system which can be coupled to public or private switched telephone networks, and more specifically to such a system which is able to effectively locate cordless units therein.

2. Description of the Prior Art

A wide area cordless telephone system is designed to serve a relatively wide business area such as occurs within a building, factory, etc., and which is previously divided into a plurality of small service zones. An access or fixed station is provided in each of the service zones for establishing communications between the public or private switched telephone network and a plurality of cordless (or mobile) units located therein.

Before turning to the present invention it is deemed advantageous to discuss a known technique with reference to FIG. 1 which schematically depicts the overall layout of a wide area cordless telephone system.

As shown in FIG. 1, twelve access stations 11-22 are located at spaced intervals and arranged respectively to define twelve divided service zones 11-22 (denoted by the same numerals as the corresponding stations merely for the sake of description), the boundaries of which are specified by the corresponding broken lines. It should be noted however, that each of the service zones 11-22 is in actual practice inevitably irregularly shaped due to varying electrical field strength of signals from the corresponding access unit. For the convenience of explanation only two cordless units 40 and 40' are illustrated and are shown as being located within the service zones 11 and 21 respectively, in this particular example. Each of the access stations 11 to 22 is coupled to a radio control unit (RCU) 42 which is in turn coupled to a service console 44 and to a private branch exchange 46. Cordless units in the telephone network system shown in FIG. 1, may access a public switched telephone network denoted by 48 via the private branch exchange 46.

In order to establish communications between the cordless units employed in the wide area cordless telephone system, it is absolutely necessary that the RCU 42 is able to exactly locate all of the cordless units. To this end, when the cordless unit (for example) issues a unit location registration request signal (frequently referred to merely as "request signal" for simplicity), a known technique deals with the request signal as follows.

It is assumed that: (a) the cordless unit 40 issues a request signal and (b) each of the access stations 11-22 has received the request signal from the unit 40 and relays the request signal to the RCU 42 after adding thereto an electrical field strength of the request signal received. The RCU 42 compares the electrical field strengths (viz., signal levels) applied via a plurality of the access stations 11-22, and determines the strongest electrical field strength (viz., the highest signal level) and determines the location of the cordless unit 40 based on this paramenter. In the event that the electrical field strength information applied from the access station 11 is the strongest, the RCU 42 responds by determining the location of the cordless unit 40 as being service zone 11.

Although it is not clear from FIG. 1, the boundaries of the service zones are practically very complex with this kind of cordless telephone system, and as such there exists a high possibility that all of the access stations 11 to 22 may receive the request signal from the cordless unit 40 as above mentioned. In this case, the RCU 42 is undesirably required to compare a large number of signal levels each time such a location registration request signal issues. This problem inherent in the prior art technique is extensively enhanced when the request signal is intermittently issued by each of the cordless units at relatively short time intervals (30 seconds for example).

SUMMARY OF THE INVENTION

It is an object of the present invention to provide a method of effectively locating the cordless unit in the wide area cordless telephone system.

Another object of the present invention is to provide a method by which the signal level comparison operation at the radio control unit can extensively be reduced.

Another object of the present invention to provide an arrangement of effectively locating the cordless unit in the wide area cordless telephone system.

Still another object of the present invention is to provide an arrangement by which the signal level comparison operation at the radio control unit can extensively be reduced.

More specifically a first aspect of the present invention is deemed to come in a method of locating cordless units in a telephone system wherein a service area is previously divided into a plurality of small service zones and wherein a plurality of cordless units are provided for establishing communications with a system controller via a plurality of access stations, the system controller locating the cordless units and storing therein location data thereof, each of the cordless units also storing the location data thereof applied from the system controller, the method comprising the steps of: (a) allowing a cordless unit to issue a request signal by which a cordless unit location is performed; (b) receiving the request signal at an access station, the access station checking to determine if the request signal applied thereto is issued from a cordless unit whose location data indicates a service zone belonging to a predetermined service zones; and (c) in the event that the cordless unit location data applied to the access station is found to fall within the predetermined service zones, the access station relays the request signal applied thereto, together with a signal level of the request signal, to the system controller.

A second aspect of the present invention is deemed to come in an arrangement of locating cordless units in a telephone system wherein a service area is previously divided into a plurality of small service zones and wherein a plurality of cordless units are provided for establishing communications with a system controller via a plurality of access stations, the system controller locating the cordless units and storing therein location data thereof, each of the cordless units also storing the location data thereof applied from the system controller, the arrangement comprising: means for allowing a cordless unit to issue a request signal by which a cordless unit location is performed; and means for receiving the request signal at an access station, the access station checking to determine if the request signal applied thereto is issued from a cordless unit whose location data indicates a service zone belonging to a predetermined service zones; wherein in the event that the cordless unit location data applied to the access station is found to fall within the predetermined service zones, the access station relays the request signal applied thereto, together with a signal level of the request signal, to the system controller.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 5 is a block diagram schematically showing a radio control unit used in connection with the present invention;

FIGS. 6 to 9 each is a flowchart which depicts the steps which are executed in accordance with a first embodiment of the present invention; and FIG. 10 is a flowchart which depicts the steps which are executed in accordance with a second embodiment of the present invention.

DETAILED DESCRIPTION OF THE PREFERRED EMBODIMENTS

Figure 1:
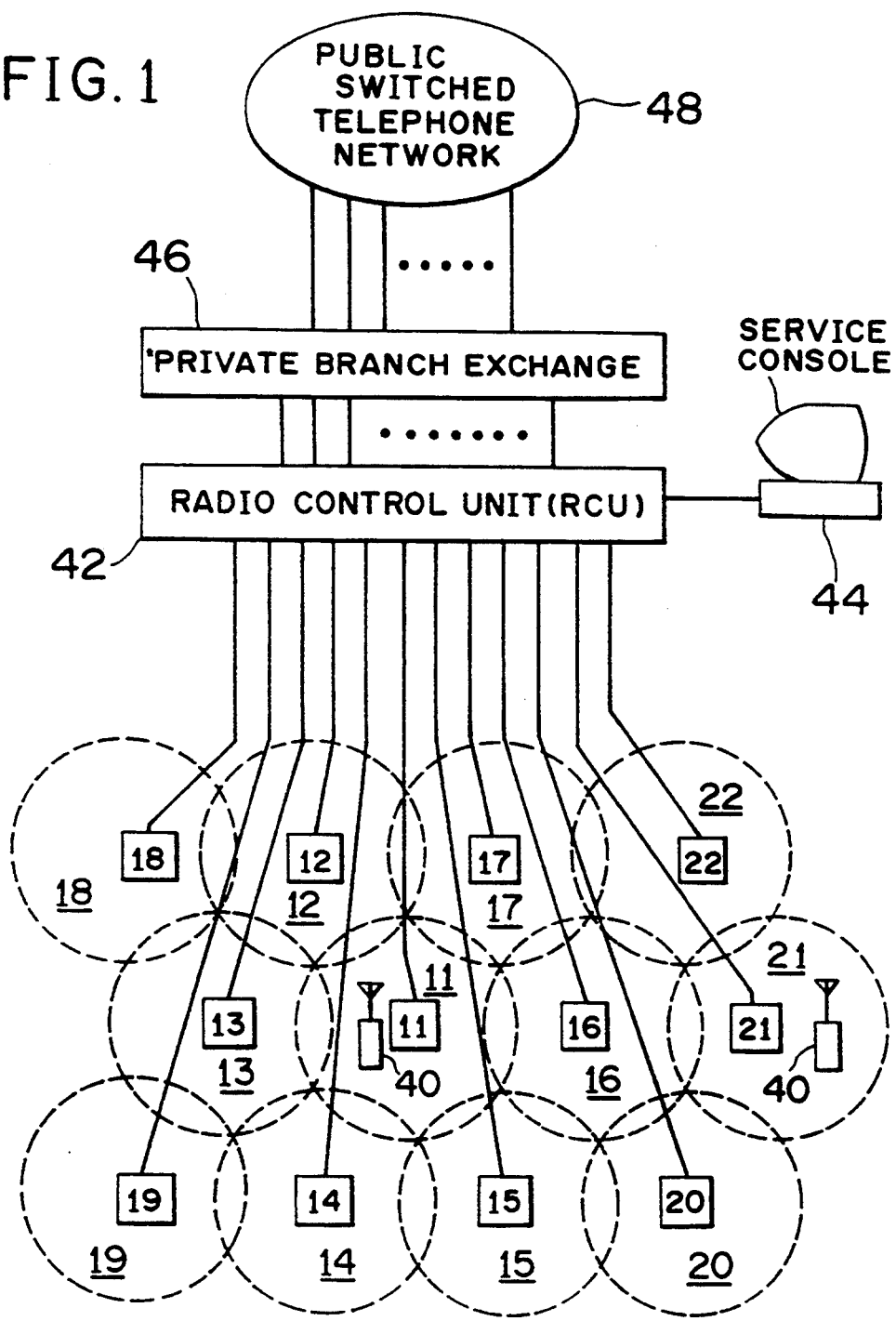
FIG. 1 is a sketch schematically illustrating the type of system to which the prior art and the present invention are applied and which has been discussed in the opening paragraphs of the instant specification.
Figure 2:
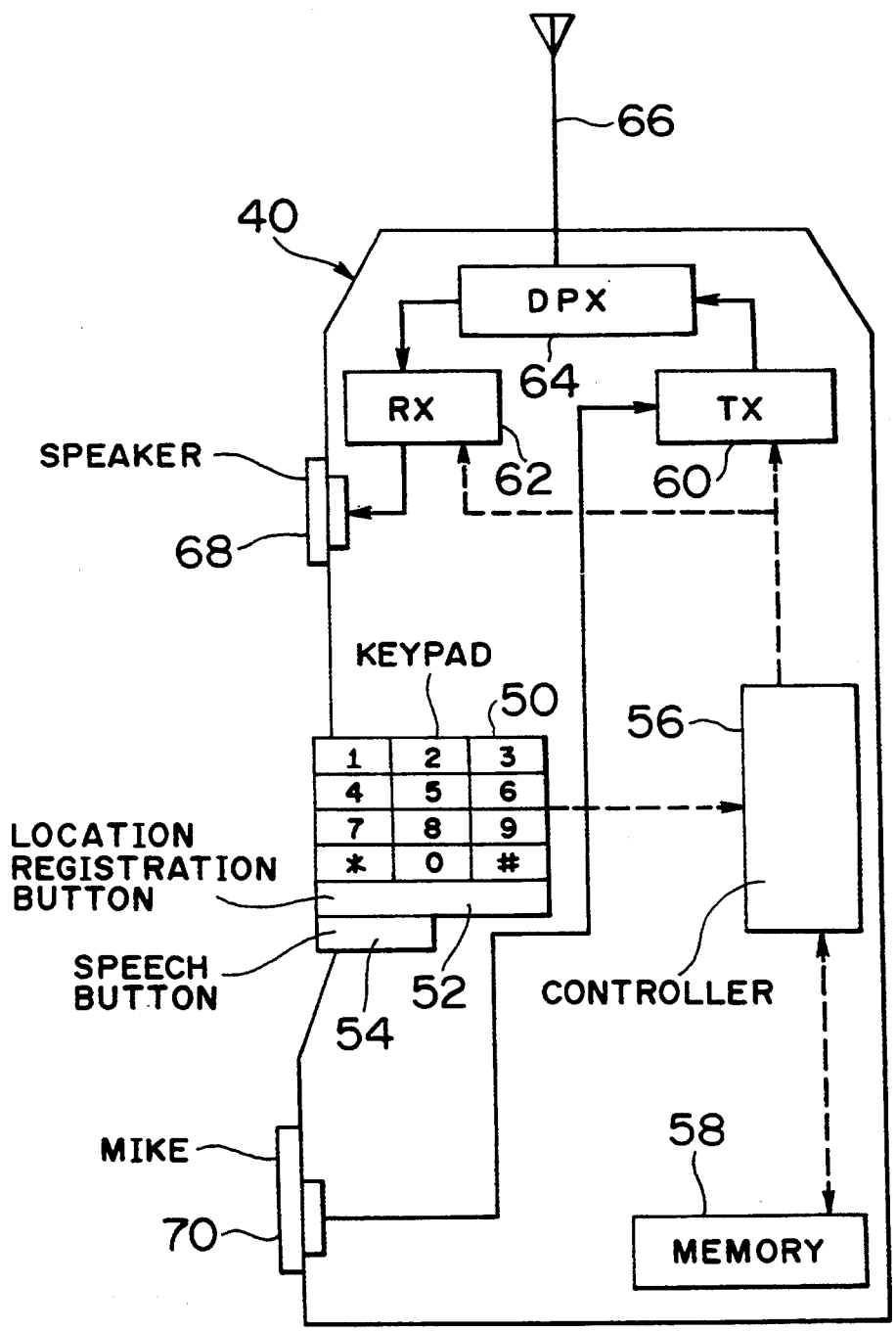
FIG. 2 is a block diagram schematically showing a cordless unit of the nature to which the present invention is applied.

FIG. 2 schematically illustrates an example of the cordless unit 40 (FIG. 1) in block diagram form. It should be noted that each of the other cordless units used in the wide area cordless system is configured in the same manner as the unit 40.

As shown in FIG. 2, the cordless unit 40 includes a keypad 50, a location registration request button 52 and a speech button 54. The keypad 50 is coupled to a controller 56 which is in turn connected to a memory 58, a transmitter (TX) 60 and a receiver (RX) 62. The memory 58 stores: a cordless unit identifier (ID) previously assigned thereto; and a service zone ID which is subject to renewal when the unit 40 moves to another service zone. When an user wishes to initiate a call, the user pushes the speech button 54 and then the destination telephone number using the keypad 50. The call request is transmitted via the transmitter 60, a duplexer 64 and an antenna 66. The cordless unit 40 is further provided with a speaker 68 and a microphone 70. A normal speech operation of the cordless unit 40 is well known in the art and is not directly concerned with the instant invention, so that a description thereof is omitted for the sake of simplicity.

Figure 3:
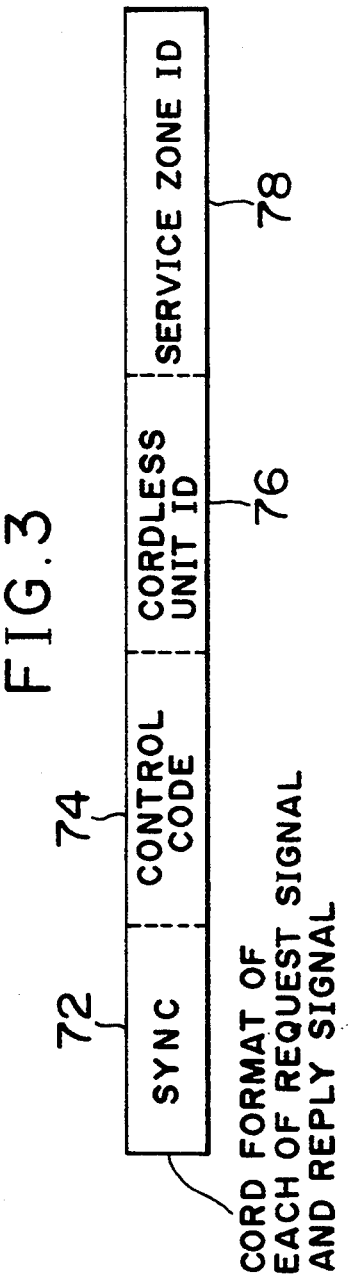
FIG. 3 is a chart showing a code format of a cordless unit location registration request signal applied from the cordless unit to the access station.

When the user wishes to register the zone in which the cordless unit 40 is located, at the radio control unit 42 (FIG. 1), the user pushes the button 52. The controller 56, in response to the output from the button 52, sends a location registration request signal through the transmitter 60, the duplexer 64 and the antenna 66. The code format of the request signal is shown in FIG. 3. As shown, the code format includes a synchronizing code 72, a control code 74, a cordless unit identifier (ID) 76 and a service zone ID 78. The synchronizing code 72 is used to synchronized operations of modulation and demodulation and consists of 16 bits merely by way of example, while the control code 74 specifies a cordless unit location registration request signal, an originating call, an incoming call, etc. The unit ID 76, which corresponds to the unit ID stored in the memory 58 of the unit 40, distinguishes which cordless unit has issued the request signal. The service zone ID 78 corresponds to the service zone data stored in the memory 58. In other words, if the cordless unit 40 has previously stored the service zone 11 specified by the access station 11, then the zone ID 78 contains "11". Alternatively, in the event that the cordless unit 40 has not had any zone data set in its memory 58, the zone ID 78 defaults to "00" merely by way of example. Such a situation comes in the case where: (a) the cordless unit 40 is newly installed in the system, (b) the content of the memory 58 has been erased due to battery change, etc.

Figure 4:
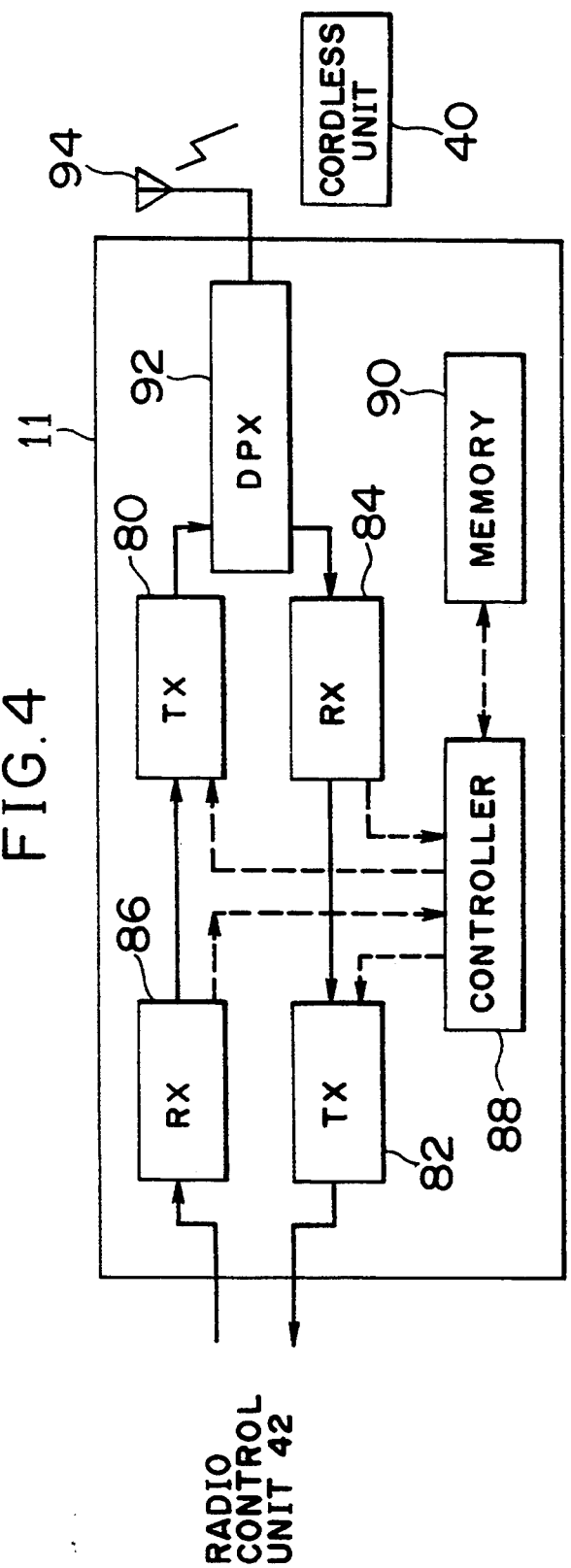
FIG. 4 is a block diagram schematically showing an access station of the nature used in the embodiment of the present invention.

FIG. 4 schematically illustrates the access station 11 in block diagram form. Each of the other access stations 12-22 is configured in the same manner as the station 11. As shown, the access station 11 includes two transmitters 80, 82, two receivers 84, 86, a controller 88, a memory 90 and a duplexer 92 coupled to an antenna 94. The access station 11 communicates with the cordless unit 40 and may also communicate with other cordless units beyond the zone boundaries.

The controller 88 supervises the overall operation of the access station 11, while the memory 90 stores the service zone data (via., station number) previously assigned thereto via input at the service console 44 and which has applied thereto via the radio control unit 42. The operations of the blocks 80, 82, 84, 86 and 92 are not directly concerned with the present invention and further are well known in the art. Accordingly, a detailed description thereof will be omitted for brevity.

FIG. 5 schematically shows the radio control unit 42 in block diagram form. As shown, the control unit 42 includes a plurality of pairs of transmitter and receiver, respectively denoted by (100R(1), 100T(1)), . . . , (100R(n), 100T(n)), a time-division switching unit (TDSW) 102, a plurality of interfaces 104(1), . . . , 104(k) interconnected between the TDSW 102 and the private branch exchange 46. The TDSW 102 is a unit for providing a common path with separate time intervals assigned to each of the simultaneous cells, as is well known in the art. The radio control unit 42 further includes a memory 106 and a controller 112. The memory 106 includes a RAM (Random Access Memory) 108 and a ROM (Read Only Memory) 110.

The RAM 108 stores the data listed below which are related with the instant invention.

(a) service zone numbers previously assigned to the access stations in the system. The service zone data have been entered into the system using the service console 44. As previously referred to, the zone numbers are made equal to the corresponding station numbers in the instant specification.

(b) cordless unit locating zone numbers for identifying the individual cordless units used in the telephone system. Each of the unit locating zone numbers is subject to renewal, using the location registration button 52, when the corresponding cordless unit moves into another zone.

On the other hand, the ROM 110 stores firmware by which the overall operations of the RCU 42 is controlled. By way of example, the frequencies of the receivers 100R(1)-100R(n) and transmitters 100T(1)-100T(n) are determined by the controller 112 using the firmware. However, the firmware is not directly related with the instant invention.

The controller 112 compares the electrical field strengths (viz., the signal levels) of the aforesaid request signals which are received by the access stations and then applied to the RCU 42, and determines the strongest electrical field strength based on this parameter. The zone number, which corresponds to the highest signal level, is stored in the RAM 108. More specifically, the zone number thus determined is registered as a new zone number of a given cordless unit. After completion of the comparison, under control of the controller 112, the RCU 42 supplies the cordless unit, which has requested the unit location registration, with a reply signal indicating the determined zone number. It should be noted that only the access station which has issued the request signal with the highest level is allowed to receive the reply signal. The code format of the reply signal is shown in FIG. 3. The cordless unit in question thus stores the new zone number in the memory 58.

The present invention will be discussed in detail hereinbelow. It should be noted that if the request signal issued from a given cordless (mobile) unit contains service zone data "00" in zone ID 78 (FIG. 3), the operation for locating the cordless unit is implemented in a manner as the known operation. That is to say, the access stations each of which has received the request signal, supplies the RCU 42 with the request signal received and the signal level thereof. The RCU 42 compares all of the signal levels applied thereto from the access stations, and responds by determining the highest signal level.

Operation of the cordless unit 40 will be discussed with reference to FIGS. 6, 8 and 9, wherein it is assumed that:

(a) the unit 40 is located in the service zone 11;

(b) the unit 40 has already stored the service zone data "11" or no zone data in the memory 58; and (c) the signal level of the request signal issued from the unit 40 and then received by the access station 11, has the highest level among those of the same request signal received by the access stations 12-17.

As shown in FIG. 6, the cordless unit 40 remains in the waiting state (step 150) until the button 52 is pressed. Step 152 checks to see if the button 52 is pressed, and if the answer is affirmative, the program goes to step 154 wherein the request signal is sent to the access station 11. If the zone data "11" has been stored in the memory 58, the service zone ID 78 (FIG. 3) of the request signal indicates the zone data "11". Following this, the program goes to step 166 of FIG. 8.

In FIG. 8, until the request signal is applied to the station 11 from the cordless unit 40, the station 11 remains in the waiting state thereof (step 166). Step 168 checks to see if the request signal is applied to the station 11 from the unit 40 (step 168). If the answer is affirmative then the program goes to step 170. It is assumed that the zone ID of the request signal from the unit 40 contains the zone data "11". Therefore, step 172 is executed. In this case, the zone ID 78 of the request signal indicates the zone data "11" and hence the station 11 supplies the RCU 42 with the request signal and the signal level thereof (step 174).

As seen from FIG. 8, the zone ID of the request signal is checked to determine if the zone ID applied to a given access station belongs to a predetermined zone group. More specifically, the zone group consists of a given zone and the zones directly adjacent thereto. This zone grouping is able to extensively reduce the comparison operation at the radio control unit 42 as will be understood as the description further proceeds.

Following the execution at step 174, the program goes to step 182 of FIG. 9. In FIG. 9, the RCU 42 remains in the waiting state thereof (step 182). In the event that the RCU 42 receives request signals from access stations (step 184), next step 186 is executed. Viz., the controller 112 of the RCU 42 compares the signal levels received and determines the highest level. Following this, the RCU 42 applies a unit location indicating signal to the access station which has issued the request signal having the highest level (step 188). Further, the cordless unit location data in the RAM 108 is renewed (step 188). The program exits the flowchart of FIG. 9 and goes back to step 178 of FIG. 8.

In FIG. 8, step 178 checks to see if the access station 11 is supplied with the unit location indicating signal from the RCU 42. Since the request signal from the access station 11 has been assumed to have the highest level, the answer is affirmative at step 178 and hence next step 180 is executed. That is to say, the access station 11 supplies the cordless unit 40 with the reply signal wherein the located zone data "11" is included in this particular case. Following this, the program goes to step 160 of the flowchart shown in FIG. 6.

Returning to FIG. 6, at a step 160 a check is performed to determine if the unit 40 receives the reply signal. Since the answer is affirmative in this case, the next step 162 is executed. Thus, the unit 40 stores the zone data "11" in the predetermined storage portion of the memory 58 under control of the controller 56. If the unit 40 initially holds the zone data "11" then the resultant zone data remains unchanged.

Alternatively, if the cordless unit 40 stores no zone data, the zone data ID takes the zone data "00" (step 154 of FIG. 6). Further, the program goes to step 174 via step 170 (FIG. 8) and then to steps 184, 186 and 188 (FIG. 9). It has been assumed that the request signal issued from the access station 11 has the highest level, and accordingly the cordless unit 40 stores the zone data "11" (step 162) in the same manner as mentioned above.

Turning now to FIG. 7, wherein there is shown a flowchart for describing another operation of the unit 40. It is assumed in this case that: (a) the cordless unit 40 moves into a service zone N (not shown) remote from the zones shown in FIG. 1 while holding the zone data "11" therein and (b) the request signal from the unit 40 does not reach any of the service zones 11-17. In FIG. 7, the case where the unit 40 initially stores no zone data, is not referred to in that such a case will be understood without difficulty from the above-mentioned descriptions. The flowchart of FIG. 7 differs from that of FIG. 6 in that step 164 is executed in the flowchart of FIG. 7. For the sake of simplicity, each of steps of FIG. 7 is denoted by the same numeral as the counterpart but is given a prime. As in the flowchart shown in FIG. 6, the program of FIG. 7 exits after the execution of step 154' and enters the flowchart of FIG. 8. In this case, at step 172 (FIG. 8) the answer is NO and hence no reply signal is applied from the access station 11 to the unit 40. Accordingly, at step 160' the answer is NO, so that step 164' is executed for clearing the zone data storage portion of the memory 58. Thus, the zone data "00" is applied to the zone ID 78 of the request signal at step 154'. The following operations of the flowchart shown in FIG. 7 will be clearly understood when considering the above descriptions and, accordingly, the descriptions thereof will be omitted for brevity. In this case, the unit 40 finally stores the zone data "N" in the memory 58.

FIG. 10 shows a flowchart which illustrates another operation of the cordless unit 40 (for example) (second embodiment). According to the FIG. 10 flowchart, the request signal is automatically issued at predetermined time intervals (30 seconds merely by way of example) at step 200. The remaining steps of FIG. 10 flowchart are exactly the same as the corresponding steps shown in FIG. 6. The FIG. 10 flowchart enables the cordless units to be periodically located. Accordingly, it can avoid a problem such that a given cordless unit inadvertently moves to a remote service zone without manual operation for location renewal.

While the foregoing description described preferred embodiments according to the present invention, the various alternatives and modifications possible without departing from the scope of the present invention, which is limited only by the appended claims, will be apparent to those skilled in the art.

What is claimed is:

1. A method of locating cordless units in a telephone system wherein a service area is previously divided into a plurality of small service zones and wherein a plurality of cordless units are provided for establishing communications with a system controller via a plurality of access stations, the system controller locating the cordless units and storing therein location data thereof, each of the cordless units also storing the location data thereof applied from the system controller, said method comprising the steps of:
    (a) issuing from a cordless unit a request signal which includes cordless unit location data, said location data indicating a zone corresponding to an access station with which said cordless unit last communicated,
    (b) receiving said request signal at an access station, said access station checking to determine if the request signal applied thereto is issued from a cordless unit whose location data indicates a service zone belonging to a predetermined service zone group which is composed of the service zone corresponding to the access station with which the location data indicates the cordless unit last communicated and one or more service zones directly adjacent thereto; and
    (c) in the event that the cordless unit location data applied to the access station is found to fall within said predetermined service zone group, the access station relays the request signal applied thereto, together with a signal level of the request signal, to the system controller, otherwise the receiving access station does not relay the request signal to the system controller.

2. A method as claimed in claim 1, wherein the request signal is generated by manual handling means provided therefor.

3. A method as claimed in claim 1, wherein the request signal is generated at predetermined time intervals.

4. An arrangement of locating cordless units in a telephone system wherein a service area is previously divided into a plurality of small service zones and wherein a plurality of cordless units are provided for establishing communications with a system controller via a plurality of access stations, the system controller locating the cordless units and storing therein location data thereof, each of the cordless units also storing the location data thereof applied from the system controller, said arrangement comprising:
    means for causing a cordless unit to issue a request signal which includes cordless unit location data, said location data indicating a zone corresponding to an access station with which said cordless unit last communicated; and
    means for receiving said request signal at an access station, said access station checking to determine if the request signal applied thereto is issued from a cordless unit whose location data indicates a service zone belonging to a predetermined service zone group which is composed of the service zone corresponding to the access station with which the location data indicates the cordless unit last communicated and one or more service zones directly adjacent thereto,
    wherein in the event that the cordless unit location data applied to the access station is found to fall within said predetermined service zone group, the access station relays the request signal applied thereto, together with a signal level of the request signal, to the system controller, otherwise the receiving access station does not relay the request signal to the system controller.

5. An arrangement as claimed in claim 4, wherein the request signal is generated by manual handling means provided therefor.

6. An arrangement as claimed in claim 4, wherein the request signal is generated at predetermined time intervals.

7. An arrangement including a radio control unit, a plurality of access stations and a plurality of cordless units, said plurality of access stations covering a plurality of small service zones, respectively, which constitute a service area controlled by said radio control unit,
    each of said cordless units comprising:
    means for storing zone data, said zone data indicating a zone corresponding to an access station with which said cordless unit last communicated;
    means for transmitting a request signal including the stored zone data;
    means for receiving a reply signal including zone data; and
    means for replacing the stored zone data with the zone data included in the received reply signal,
    each of said access stations comprising:
    means for receiving a request signal;
    means for producing a control signal only when the received request signal includes zone data indicating a service zone which falls within predetermined service zones which are composed of the service zone corresponding to the access station with which the zone data indicates the cordless unit last communicated and one or more service zones directly adjacent thereto;

means responsive to said control signal for forwarding to said radio control unit said received request signal with the signal level thereof; and means for forwarding from said radio control unit, to said cordless unit which has transmitted a request signal, a reply signal including zone data indicating a service zone covered by an access station which has forwarded said request signal with the highest signal level.

8. An arrangement as claimed in claim 7, wherein said radio control unit comprises:

means for comparing the signal levels forwarded along with request signals to select a particular access station which has forwarded a request signal with the highest signal level; and means for sending to said particular access station a reply signal including zone data indicating a service zone covered by said particular station.

9. A method of renewing zone data stored in a cordless unit which is in a service area divided into a plurality of small zones respectively covered by a plurality of access stations connected to a radio control unit, said method comprising the steps:

issuing from said cordless unit a request signal including the stored zone data, said zone data indicating a zone corresponding to an access station with which said cordless unit last communicated;

forwarding said request signal from a group of access stations to said radio control unit only if said zone data included in said request signal indicates a service zone belonging to a group of predetermined service zones which are composed of the service zone corresponding to the access station with which the zone data indicates the cordless unit last communicated and one or more service zones directly adjacent thereto;

selecting at said radio control unit a particular access station which has forwarded said request signal with the highest signal level;

sending from said radio control unit to said cordless unit via said particular access station a reply signal including zone data indicating said particular access station;

receiving said reply signal at said cordless unit; and replacing the stored zone data with the zone data included in the received reply signal.

* * * * *